United States Patent
Mermoud et al.

(10) Patent No.: US 10,062,036 B2
(45) Date of Patent: Aug. 28, 2018

(54) PREDICTIVE PATH CHARACTERISTICS BASED ON NON-GREEDY PROBING

(71) Applicant: Cisco Technology, Inc., San Jose, CA (US)

(72) Inventors: Grégory Mermoud, Veyras (CH); Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 14/280,082

(22) Filed: May 16, 2014

(65) Prior Publication Data

US 2015/0332155 A1 Nov. 19, 2015

(51) Int. Cl.
*G06N 99/00* (2010.01)
*G06N 5/04* (2006.01)

(52) U.S. Cl.
CPC .......... *G06N 99/005* (2013.01); *G06N 5/048* (2013.01)

(58) Field of Classification Search
CPC .............................. G06N 99/00; G06N 99/005
See application file for complete search history.

(56) References Cited

U.S. PATENT DOCUMENTS

| | | | |
|---|---|---|---|
| 7,813,870 B2 | 10/2010 | Downs et al. | |
| 8,189,482 B2 | 5/2012 | Vasseur et al. | |
| 8,670,326 B1 | 3/2014 | Balasubramanian et al. | |
| 2002/0099844 A1* | 7/2002 | Baumann ................ | H04L 47/10 709/232 |

FOREIGN PATENT DOCUMENTS

| | | |
|---|---|---|
| EP | 2728828 A1 | 5/2014 |
| WO | WO-2002080417 A1 | 10/2002 |

OTHER PUBLICATIONS

A. Eswaradass, X. Sun, and M. Wu, "A Neural Network Based Predictive Mechanism for Available Bandwidth", 19th IEEE Int'l Parallel and Distributed Processing Symp., 2005, 10 pages.*
P. Hu and P. Steenkiste, "Evaluation and Characterization of Available Bandwidth Probing Techniques", IEEE J. on Selected Areas Comm., vol. 21, No. 6, Aug. 2003, pp. 879-894.*
W. Yan, "Towrads automatic time-series forecasting", IEEE Trans. on Neural Net. and Learning Sys., vol. 23, No. 7, Jul. 2012, pp. 1028-1039.*
F. Soldo and A. Metwally, "Traffic Anomaly Detection Based on the IP Size Distribution", Proc. IEEE INFOCOM 2012, pp. 2005-2013.*
Sajassi, et al., "BGP MPLS Based Ethernet VPN", Network Working Group, Internet Draft, draft-ietf-l2vpn-evpn-07, 50 pages, May 2014, Internet Engineering Task Force Trust.

* cited by examiner

*Primary Examiner* — Vincent Gonzales
(74) *Attorney, Agent, or Firm* — Parker Ibrahim & Berg LLP; James M. Behmke; Stephen D. LeBarron

(57) ABSTRACT

In one embodiment, a network device receives metrics regarding a path in the network. A predictive model is generated using the received metrics and is operable to predict available bandwidth along the path for a particular type of traffic. A determination is made as to whether a confidence score for the predictive model is below a confidence threshold associated with the particular type of traffic. The device obtains additional data regarding the path based on a determination that the confidence score is below the confidence threshold. The predictive model is updated using the additional data regarding the path.

20 Claims, 10 Drawing Sheets

PREDICTIVE PATH CHARACTERISTICS BASED ON NON-GREEDY PROBING

TECHNICAL FIELD

The present disclosure relates generally to computer networks, and, more particularly, to probing techniques in computer networks.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. However, such a reactive approach may also, by its very nature, mean that the network experiences periods of reduced performance before corrective measures are taken.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network device receives metrics regarding a path in the network. A predictive model is generated using the received metrics and is operable to predict available bandwidth along the path for a particular type of traffic. A determination is made as to whether a confidence score for the predictive model is below a confidence threshold associated with the particular type of traffic. The device obtains additional data regarding the path based on a determination that the confidence score is below the confidence threshold. The predictive model is updated using the additional data regarding the path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
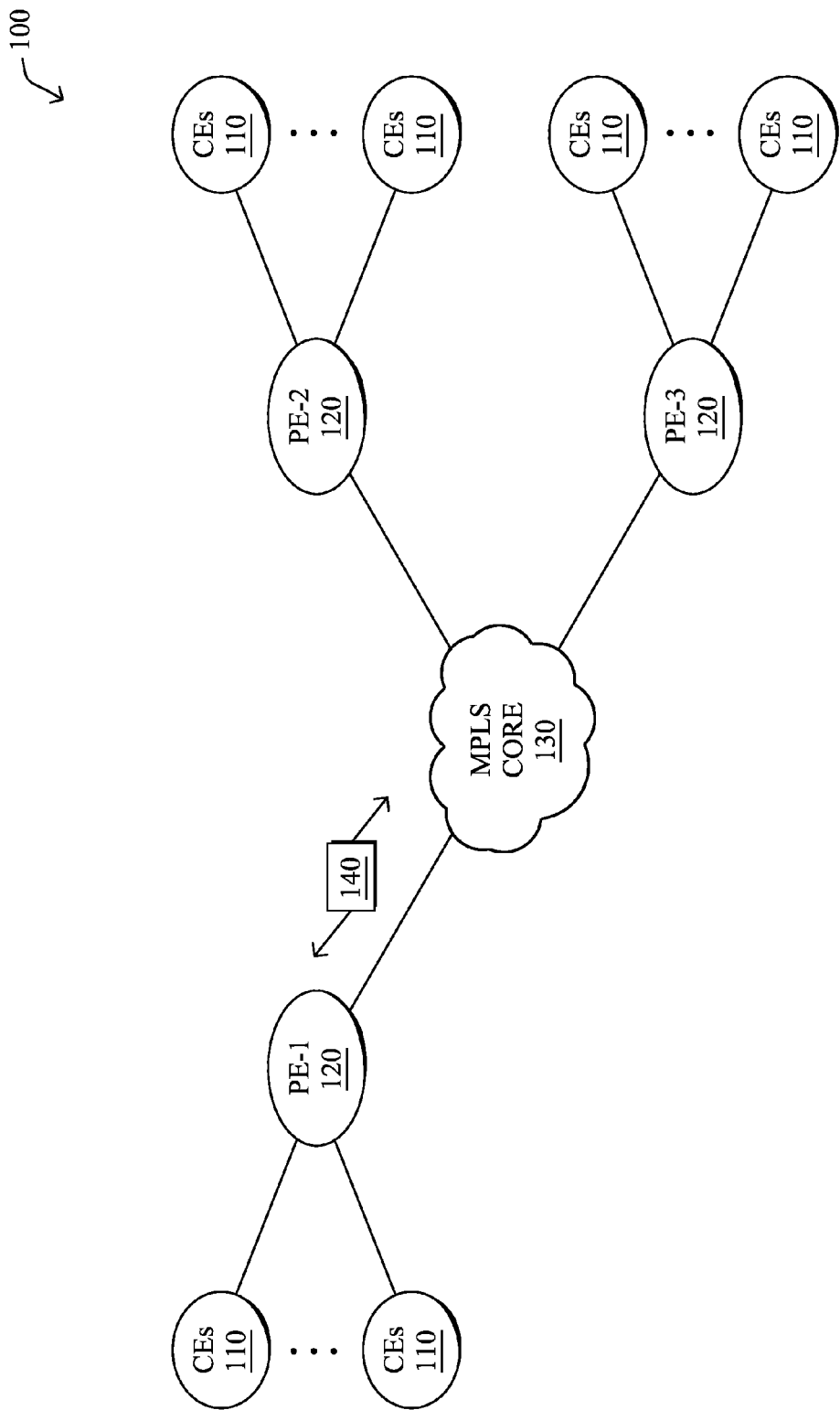
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
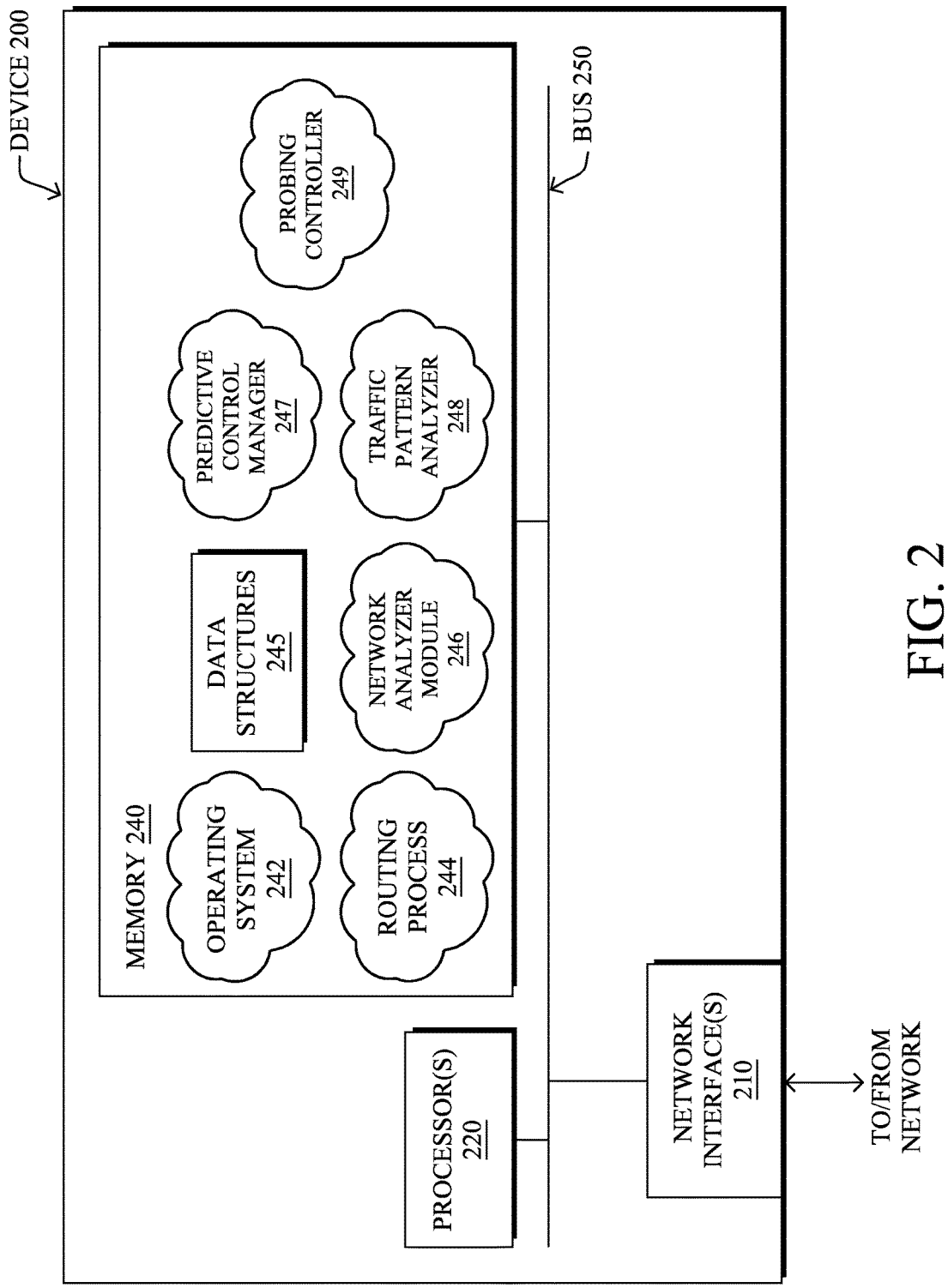
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CEs 110, a network controller (e.g., a device associated with a network operations center (NOC)), or any other computing device that supports the operations of network 100 (e.g., switches, etc.). Device 200 comprises a plurality of network interfaces 210, one or more processors 220, and a memory 240 interconnected by a system bus 250 and powered by a power supply 260. The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may comprise routing process 244 (e.g., routing services) and illustratively, a network analyzer module (NAM) 246, a predictive control manager (PCM) 247, a traffic pattern analyzer (TPA) 248, and/or a probing controller 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instances, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduces a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performances in terms of connectivity and bandwidth.

According to various embodiments described herein, a dynamic, predictive performance architecture is disclosed that may be implemented in a network, such as a multiservice, multi-carrier WAN. In particular, NAM 246, PCM 247, TPA 248, and/or probing controller 249 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. Probing controller 249 may operate to determine network characteristics, such as those used by NAM 246, by sending probing traffic along a given network path. In various implementations, processes 244 and 246-249 may be co-located or may be distributed across different network devices. Further, while certain functions are described herein with respect to a particular one of processes 244, 246-249, the functions may be incorporated into any of the other processes, in various other embodiments.

Figure 3:
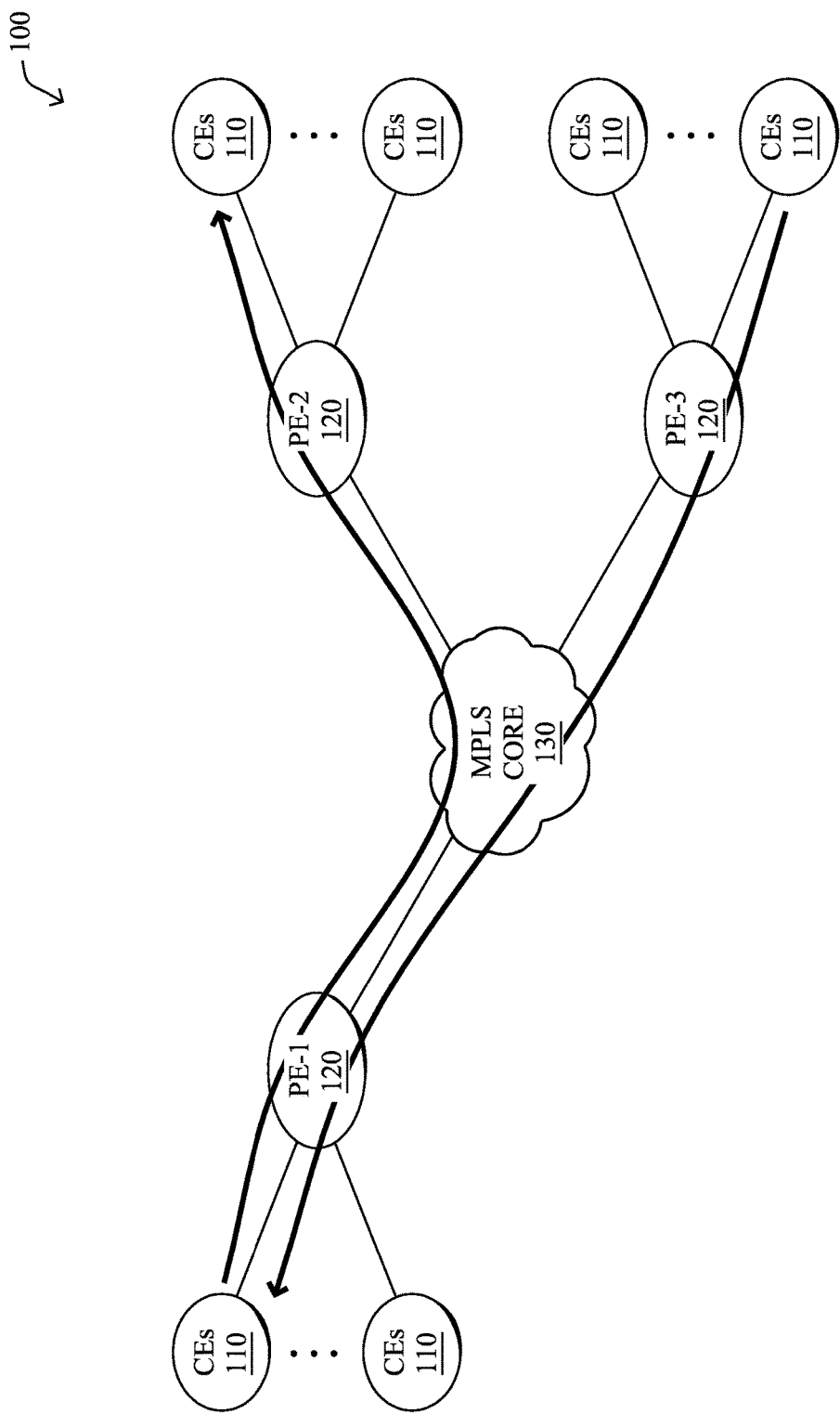
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

According to various embodiments, a predictive performance methodology for WANs and other forms of networks is introduced that that allows for its use across varying network architectures, application requirements, and deployment strategies, as well as in the presence of dynamic traffic and network performances. As detailed below, such an architecture may make use of machine learning techniques, in some embodiments, to evaluate future network requirements and performance, and to take corrective measures within the network to ensure the SLAs are met.

Figure 4A:
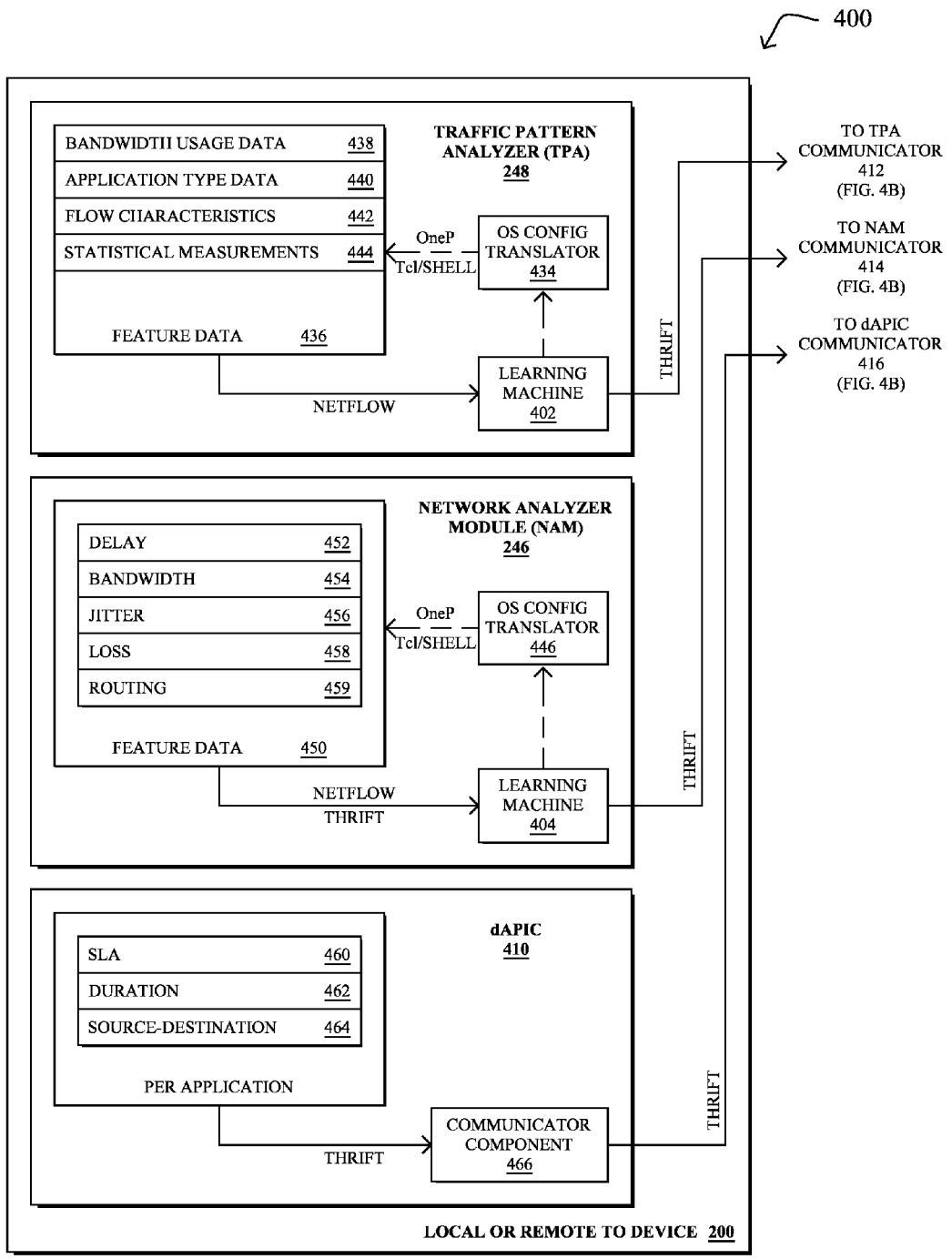
FIGS. 4A-4B illustrate an example architecture for predictive networking.
Figure 4B:
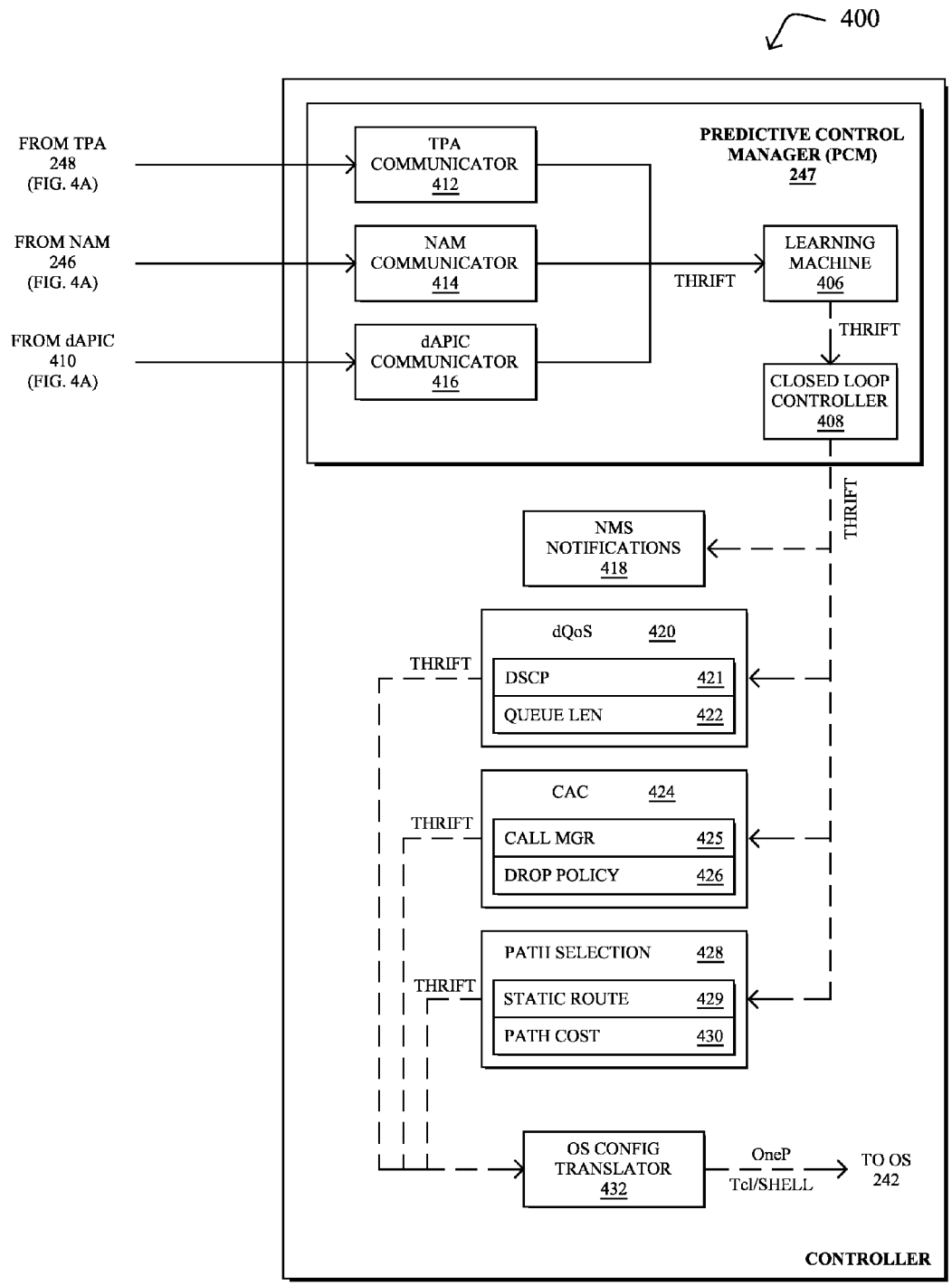

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processes for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In further implementations, learning machines 402-406 may use time series forecasting to predict future conditions of the network. Generally speaking, a time series is a sequence of data points, measured at successive points in time, typically spaced at uniform time intervals. For example, a time series used by learning machine 402 of TPA 248 may represent the amount of traffic (TA) generated by application A at regular time t1, t2, t3, etc., as follows:

$$TA = \{TA,t1,TA,t2,TA,t3,\ldots\}$$

Such a set of observations may be used to construct a statistical model that is able, at time t, to yield estimates of the quantities TA,t+1, TA,t+2, TA,t+3, etc. As will be appreciated, any number of time series models may be used by learning machines 402-406 such as, but not limited to, autoregression models (e.g., the predicted value of TA,t+1 depends linearly on the previous values TA,t−2, TA,t−1, TA,t), moving average models (e.g., the predicted value of TA,t+1 depends on the average of a given number of previous values TA,t−2, TA,t−1, TA,t), or the like. Such models may generally be called Autoregressive Moving-Average (ARMA) models. Further models that may be used to model a time series may include Hidden Markov Models (HMMs) and Gaussian processes.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 459: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, the available bandwidth along a given path may be obtained from any of the following sources: (1) SLA processes may yield data about the delay, jitter and packet loss, which can, in some circumstances, be used to estimate the available bandwidth via a regression model, such as variational Bayesian least squares (VBLS) regression model, (2) actual bandwidth measurements can be taken occasionally, but with care as they may affect network performance, or (3) time-series models such as ARMA models, HMMs, Gaussian Processes can be used to predict the performance evolution.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 460 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 460-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 460), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

As noted above, network characteristics such as bandwidth availability along a given network path may be used to make network adjustments based on predicted network and traffic behaviors. In particular, NAM 247 may use information regarding the available bandwidth along a given path to model the characteristics of the network. However, the available bandwidth within a network may be difficult to determine. For example, one of the biggest challenges in deploying public Internet services from an Internet service provider (ISP) to carry WAN traffic is the lack of ability to determine the bandwidth availability in the core network of the ISP. As the availability of bandwidth in the core of the public Internet varies significantly over time and such bandwidth is not guaranteed, it becomes very difficult to deploy new application services deterministically. Note also that such an issue also applies to SLA-based connectivity such as MPLS VPN. Indeed, although SLAs are supposedly guaranteed, overbooking still applies in these networks, thus requiring mechanisms to determine the actual network resource available.

Predictive Path Characteristics Based on Non-Greedy Probing

The techniques herein provide various mechanisms to determine path characteristics using non-greedy probing, such as the available bandwidth along a path. In some aspects, data may be aggregated from multiple sources and forwarded to a machine learning process. In further aspects, the learning machine may track the various attributes of the network using the multiple data sources and model the path characteristic of interest (e.g., available bandwidth, etc.). If additional data is needed for the model, such as when the confidence in the model's predictions is below a threshold, the system may determine whether probing the path will generate the needed data. In some cases, the probing strategy may be performed using a non-greedy approach where, if possible, additional data is obtained from non-probing sources. In yet another aspect, the level of required accuracy (e.g., on a per flow basis, on a destination basis, etc.), may be taken into account to determine the rate of dynamic probing used to model the characteristics of the path.

Specifically, according to one or more embodiments of the disclosure as described in detail below, a network device receives metrics regarding a path in the network. A predictive model is generated using the received metrics and is operable to predict available bandwidth along the path for a particular type of traffic. A determination is made as to whether a confidence score for the predictive model is below a confidence threshold associated with the particular type of traffic. The device obtains additional data regarding the path based on a determination that the confidence score is below the confidence threshold. The predictive model is updated using the additional data regarding the path.

Illustratively, the techniques described herein may be performed by hardware, software, and/or firmware, such as in accordance with processes 244, 246-249, which may include computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Figure 5:
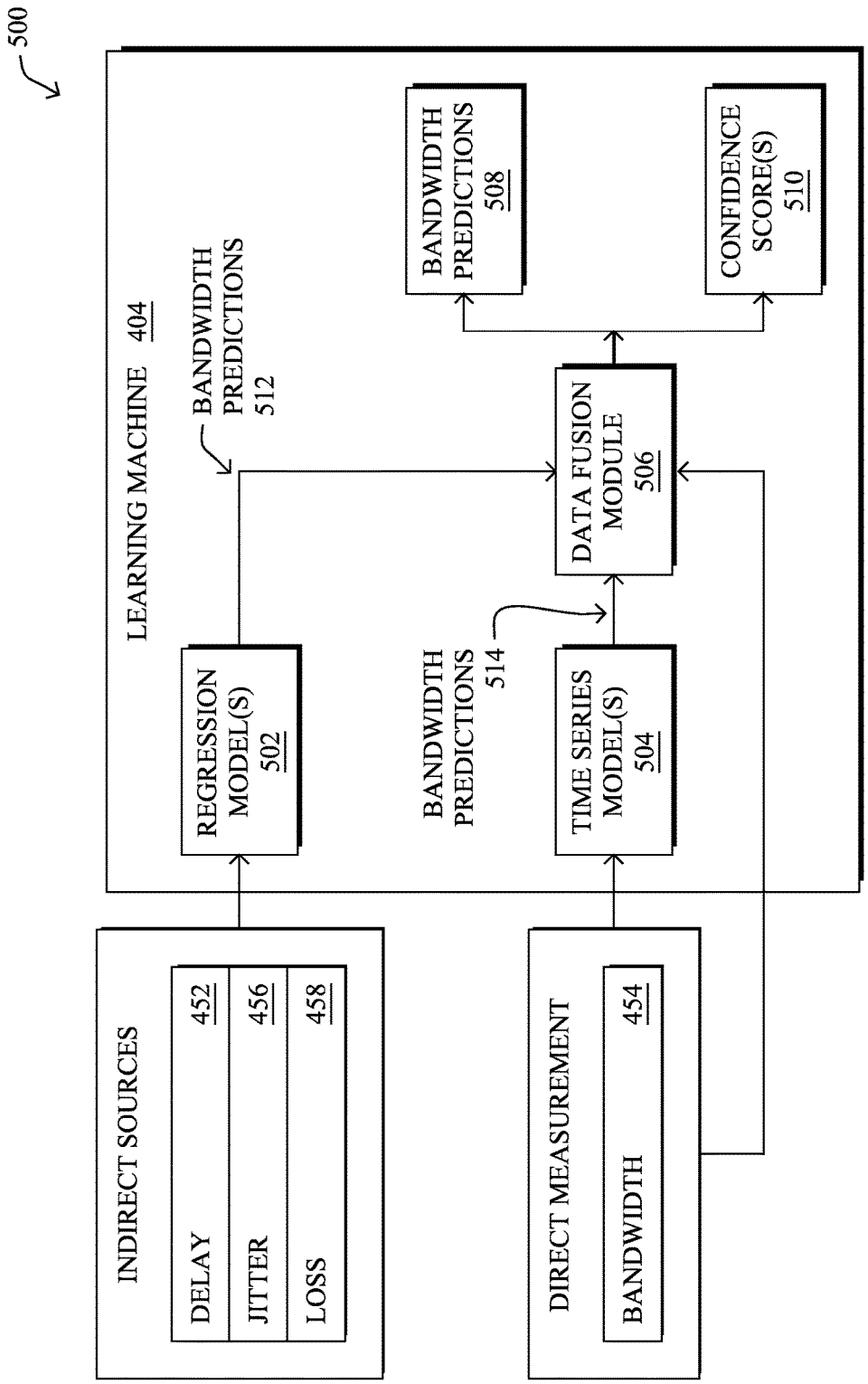
FIG. 5 illustrates an example architecture for predicting bandwidth availability.

Operationally, an example architecture for predicting available bandwidth along a path is illustrated in FIG. 5, according to various embodiments. As shown, learning machine 404 of NAM 246 may be operable to predict bandwidth availability based on direct measurements along the path (e.g., via probing the path for available bandwidth) and/or using data from indirect sources (e.g., non-bandwidth metrics). As used herein, data from indirect sources generally refers to any path metrics that differ from the metric of interest but may still be used to predict the metric of interest. For example, delay information 452, jitter information 456, and/or packet loss information 458 may be used to predict the bandwidth availability for a given path identified in routing information 459, shown previously in FIG. 4A. Said differently, non-bandwidth path metrics may still be used to make predictions regarding the bandwidth of the path.

In various embodiments, delay information 452, jitter information 456, and/or packet loss information 458 may be collected via an export/collection process executed within the network. In such a process, certain nodes may be designated as "exporters" and asked to capture and provide observations (e.g., information 452, 456, and/or 458) to one or more nodes designated as "collectors." Any node designated as a collector may aggregate the received observations for a given path or link and provide the aggregated data for processing by NAM 246. During operation, the assignment of collector and exporter roles may be changed dynamically based on the traffic loads in the network (e.g., from TPA 248) or the effects of the collection process on the network. In addition, the data that is exported by the nodes may be adjusted dynamically, depending on the needs of the system (e.g., more information may be exported to learn more about a potential attack, less information may be exported if the exported data is slowing down the network, metrics may be sampled before reporting to NAM 246 to reduce the size of the dataset, etc.).

In further embodiments, learning machine 404 may use direct measurements of the available bandwidth along a path, to make available bandwidth predictions. For example, learning machine 404 may use bandwidth information 454 obtained by probing a given path (e.g., via probing controller 249). As discussed in greater detail below, probing controller 249 may send probe packets along the path of interest and measure the response of the path, to determine the available bandwidth. For example, probing controller 249 may increase the number and/or size of the probe packets until the number of delays, packet losses, etc., along the link significantly increase. At such a time, probing controller 249 may determine that the available bandwidth along the path was consumed by the probe packets and associate the corresponding size of the probe packets sent at this time with the available bandwidth. Notably, direct bandwidth measurements via probing may be more taxing on the network and more likely to affect user traffic than the collection of non-bandwidth measurements via an export/collection process.

As shown, learning machine 404 may include a data fusion module 506 that integrates data from the multiple data sources into a single statistical model. In particular, data fusion module 506 may merge any or all of the following data: (1) Bandwidth Predictions 512—In various embodiments, the data from the indirect sources (e.g., delay information 452, jitter information 456, loss information 458, and/or other path characteristics) may be used by one or more regression models 502, to generate bandwidth predictions 512. In some implementations, a particular regression model 502 may be path and/or traffic-type specific. Example modeling techniques that may be used for regression models 502 may include support vector machines (SVMs), Bayesian networks, regression models (e.g., models that use logistic regression, linear regression, non-linear regression, etc.), combinations thereof, or any other form of predictive model that may be used to predict an available bandwidth using non-bandwidth metrics.

(2) Bandwidth Predictions 514—In various embodiments, time varying data such as bandwidth information 454 (and potentially bandwidth predictions 512 made using data from indirect sources) may be used to generate one or more time series models 504. Such models may be associated with a given path and/or a particular type of traffic, in some implementations. Example time series models that may be used for time series models 504 may include, but are not limited to, ARMA models, HMMs, or Gaussian processes. Based on the previous measurements or predictions, time series model 504 may be used to generate bandwidth predictions 514.

(3) Bandwidth Information 454—In some cases, the currently available bandwidth along a path may be determined directly, such as by probing the path via probing controller 249, and used by learning machine 404 to make bandwidth predictions.

Any or all of the above may be fused by data fusion module 506 in real time and in a mathematically principled way. For example, data fusion module 506 may merge bandwidth predictions 512, bandwidth predictions 514, and/or bandwidth information 454 to form bandwidth predictions 508. Data fusion module 506 may also take into account the intrinsic uncertainty of each source of information in the estimation of bandwidth predictions 508, as represented by confidence scores 510. In general, confidence scores 510 may be associated with bandwidth predictions 512, 514 and/or 508 and may quantify the amount of uncertainty surrounding the predictions. For example, if a direct measurement of the actual bandwidth is taken at time t (e.g., via probing), the uncertainty in bandwidth predictions 514 from time series model 504 may be very small at time t. However, as t increases, the uncertainty associated with bandwidth predictions 514 may also increase as the actual bandwidth may drift away from the initial measurement. Example forms of confidence scores may include, but are not limited to, confidence intervals, prediction intervals, or any other metrics that may quantify the degree of uncertainty associated with a given prediction or predictive model.

In some implementations, the drift in confidence scores 510 may be captured by data fusion module 506 by comparing bandwidth predictions 512 and 514 (e.g., the predictions from the time-series model and the predictions using data from indirect sources). As long as both agree (e.g., the difference between the two is less than a threshold amount), there may be no reason to perform any further direct measurements, which may be very costly in terms of network resources. However, if the predictions of time series models 504 and regression models 502 diverge, NAM 246 may trigger another direct measurement of the available bandwidth using probing controller 249.

Notably, because all models (e.g., models 502, 504, etc.) may yield both an estimate and a measure of confidence, NAM 246 may determine wither probing is needed or that predictions from a single model may be relied on to make decisions. For example, NAM 246 may determine that while bandwidth predictions 512 and 514 may differ, bandwidth predictions 514 from time series model 504 are generally reliable enough based on their associated confidence scores 510. In other words, the probing rate may be a function of the degree of uncertainty of the mathematical predictive model for a given path or link.

Figure 6A:
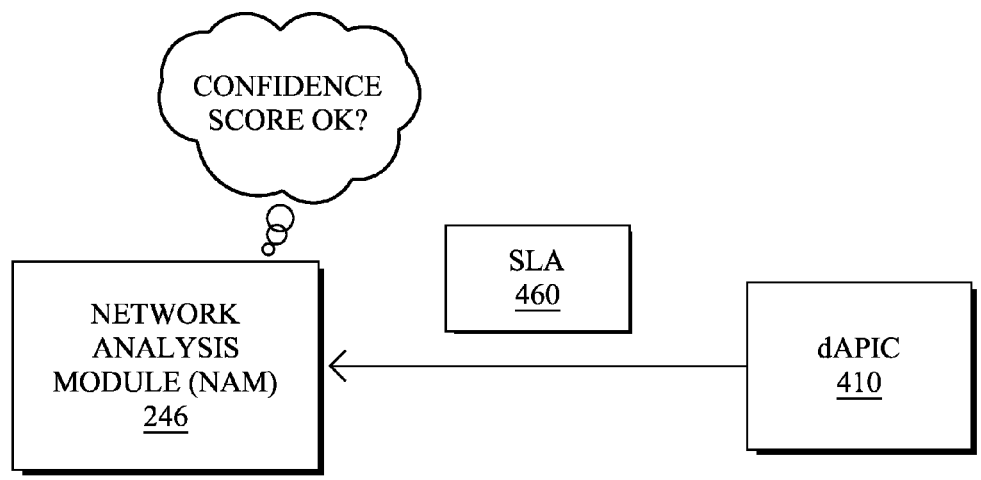
FIGS. 6A-6B illustrate an example architecture to initiate probing.
Figure 6B:
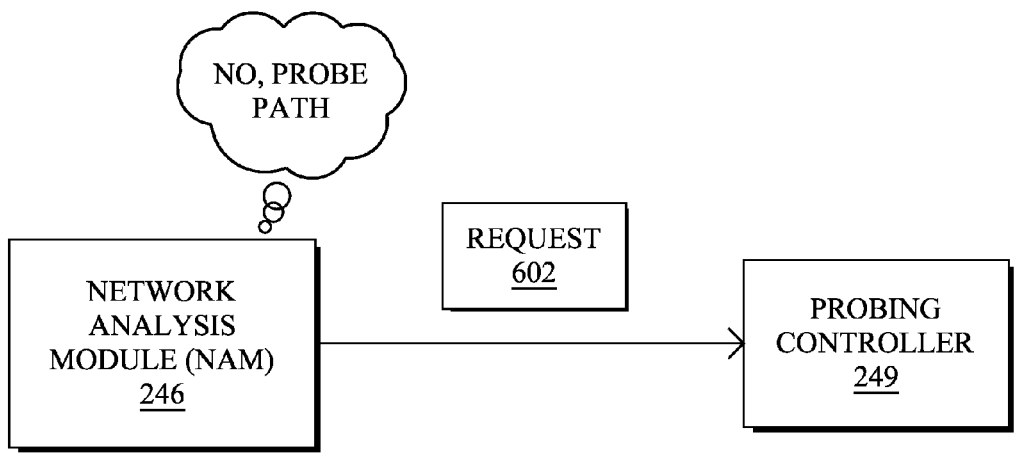

Referring now to FIGS. 6A-6B, an example architecture to initiate probing is illustrated, according to various embodiments. In some embodiments, the criticality of different types of traffic flows may be taken into account by NAM 246 before initiating probing of a particular link or path. Notably, and in contrast to other approaches, probes may only be used in some cases to train a predictive model. As the model computes its own accuracy, NAM 246 may operate to maintain a degree of confidence that is a function of the flow criticality. In other words, NAM 246 may compare confidence scores 510 to a confidence threshold associated with a particular type of traffic. For example, NAM 246 may build and use a first model for very critical traffic flows (e.g., real time flows, video conferencing flows, etc.) that require a high degree of confidence in the model's predictions, while a lower degree of confidence may be acceptable for flows that are more tolerant of delays. NMS 246 may also determine that a confidence score 510 associated with bandwidth predictions 512 based on data from indirect sources (e.g., network metrics that are exported/collected in real time) may be sufficient for more tolerant and less critical traffic flows.

As shown in FIGS. 6A-6B, NAM 246 may determine whether to initiate probing of a particular path or link based on whether the confidence scores for a particular model are below the confidence threshold for a particular type of traffic. The confidence threshold for a particular type of traffic may be received by NAM 246 from any number of sources. For example, as shown in FIG. 6A, NAM 246 may receive SLA data 460 from dAPIC 410 regarding the confidence thresholds for the different types of traffic. In further embodiments, NAM 246 may determine the required degree of model accuracy as a function of the flow specification characterized, for example, by the IPv4/IPv6 differentiated services code point (DSCP) fields used by the traffic flows, by the set of IP destinations of the traffic flows, by autonomous systems, or the like. In one embodiment, NAM 246 may send a new IPv4 or IPv6 message to a network manager or policy agent, to request traffic-specific requirements or other information that may be used by NAM 246 to determine whether to probe a given path and how such a probing should be performed. For example, when multiple types of traffic are flowing at the same time in the network, runtime policies may be developed such that more information may be obtained from indirect sources (e.g., the export/collection process of delay, jitter, packet loss information, etc.), rather than from active probes. In some cases, this may be reversed, such as when less traffic is present and the paths can afford to carry multiple probe types.

As shown in FIG. 6B, once NAM 246 determines that a particular path should be probed, it may send a request 602 to probing controller 249, to initiate probing. Request 602 may include information used by probing controller 249 to control when and/or how the probing is conducted. In some embodiments, NAM 246 may use active learning techniques to determine when and how the probes are to be sent by probing controller 249. Generally speaking, active learning is an area of machine learning that is concerned with the optimal selection of data sources, to optimize the learning process of a model. Using such techniques, learning machine 404 may be able to determine which sources to query or which input data points to select for measurement, according to an optimality score assigned to a given source (e.g., by probing a certain path to obtain a bandwidth availability measurement).

At any given point in time, NAM 246 may consider any or all of the following parameters to determine when to probe a given path:

Time of Day—In some cases, probing at a certain time of day may have less of an impact on user traffic than at other times of day. For example, if user traffic is at a maximum at 10:00 AM, NAM 246 may instruct probing controller 249 to probe a given path at another time in which less user traffic is typically present (e.g., 2:00 AM instead of 10:00 AM). In other words, the amount of available bandwidth may vary throughout the day.

Current State of Network Congestion—In some cases, NAM 246 may take into account the current state of network congestion, to determine whether or not to begin probing a given path. For example, if the path is already exhibiting congesting due to user traffic and/or other probes, NAM 246 may delay the probing until the path exhibits less congestion. Conversely, even if the current time of day has historically exhibited low available bandwidth and high traffic, NAM 246 may nonetheless initiate probing if the current state of congestion indicates that this is not the case. In some cases, such a rarely observed disagreement may be a strong indicator that it is worth probing at this time.

Current Estimate of Available Bandwidth—NAM 246 may also take into account the current estimates of available bandwidth, to determine when to initiate probing via probing controller 249. For example, if the available bandwidth is already predicted to be minimal due to user traffic, NAM 246 may delay initiating probing of a given path until a later time.

Previous Estimates and Errors from Probing—In some cases, NAM 246 may also take into account the effects and errors that resulted from prior probing. For example, if prior probes along the path resulted in a substantial amount of errors, NAM 246 may take this into consideration when determining when and whether to send a probe.

Notably, the above factors are not directly controllably by NAM 246 but may still be used by NAM 246 as part of an optimality score to determine when to initiate probing.

In other words, NAM 246 may base the decision regarding when to probe on an optimality score that takes into account any or all of the above factors. For example, low congestion at a given point in time may offset the fact that that point in time has historically experienced high amounts of traffic.

In various embodiments, NAM 246 may also determine the characteristics of the probes and include data regarding the characteristics in request 602. For example request 602 may include data regarding any or all of the following:

Path to be Probed—In various cases, request 602 may include a path identifier or other set of data that notifies probing controller 249 of the path to probe.

Type of Probing Traffic to Use—Request 602 may also indicate that a certain type of traffic should be used to probe the path. In cases in which a predictive model is associated with a particular traffic type, such a traffic type may be specified in request 602. In some implementations, traffic probes may be "colored" (e.g., marked using included data) according to their associated SLAs/application types. For example, a traffic probe for a particular VoIP application (and associated SLA) may be colored one way and a traffic probe for a video conferencing application (and associated SLA) may be colored a different way.

Frequency and/or Number of Probes—In some cases, NAM 246 may also set the frequency and/or number of probes that probing controller 249 is to send based on, for example, the current or predicted conditions of the network, the degree of confidence needed for a particular model, or other such factors.

Again, probing a path for which the bandwidth estimate is very certain is not very interesting, but, at the same time, another path may be worth probing. In some embodiments, NAM 246 may base the decision to send a probe in part on the above factors (e.g., the path to be probed, the type of probing traffic, etc.) by treating the factors as a multidimensional optimization problem to be carried out in a probabilistic framework. In particular, assume that x denotes a vector of the factors listed above. In such a case, the relevancy of x may be estimated by computing a score that maximizes the expected change in the learning machine model. Thus, in some cases, the probe settings may be selected such that they are expected to produce the greatest change in the predictive model of interest.

Figure 7:
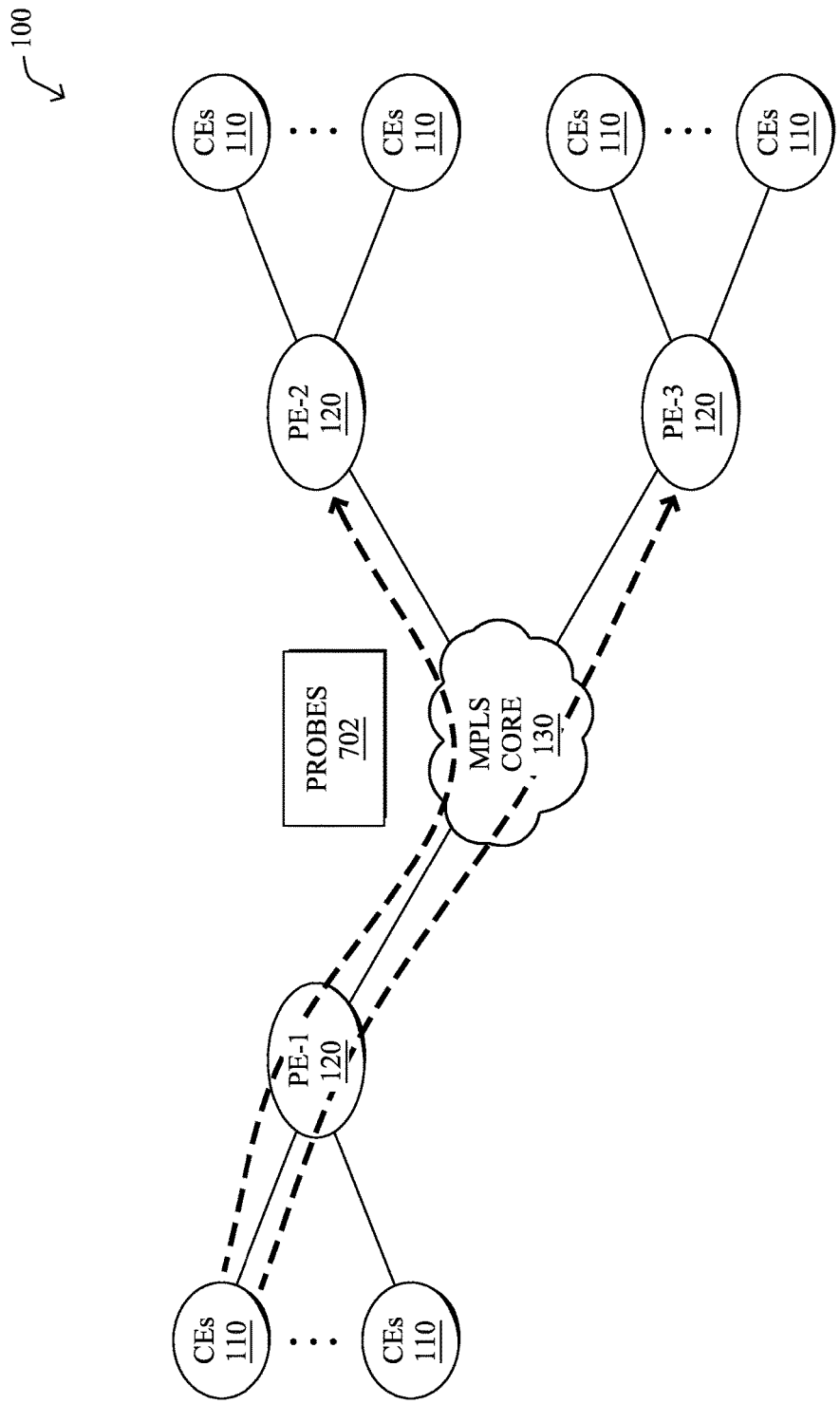
FIG. 7 illustrates an example of bandwidth probes being sent.

Referring now to FIG. 7, probing controller 249 may probe a given path in response to receiving request 602, according to various embodiments. During probing, probing controller 249 may send probes 702 along a specified path in accordance with the parameters included in request 602. For example, a particular set of probes 702 may be colored as VoIP traffic, to assess the available bandwidth along the path for this type of traffic.

In some cases, probing controller 249 may adjust the sending of probes 702 based on observed or predicted network conditions. For example, if the amount of congestion along the probed path suddenly increases, probing controller 249 may reduce the size and/or rate at which probes 702 are sent, to alleviate the congestion. Similarly, if the SLA for a particular traffic type is predicted not to be met as a result of probes 702, probing controller 249 may adjust the probing, accordingly.

Generally speaking, probing controller 249 may determine the available bandwidth along the probed path by assessing the effects of probes 702 on the path. For example, during probing, probing controller 249 may increase the amount of probing traffic until a change in the path's characteristics is detected (e.g., delay times or queue states, dropped packets, jitter, etc.). The characteristics of the probes associated with the change (e.g., the amount of probing traffic that resulted in the change) may then be used by probing controller 249 to determine the available bandwidth along the path.

In some embodiments, as discussed briefly above, one or more network policies may be used by NAM 246 to prevent proving of certain destinations, paths, or network resources, even in cases in which a model's confidence score is below an acceptable confidence threshold. For example, in the case where probing has the potential to disrupt user traffic (e.g., a high congestion condition exists), NAM 246 may opt to use the less accurate model until the condition is cleared and when allowed by policy. At such a time, NAM 246 may resume probing. In some implementations, NAM 246 may also report any conditions that may prevent probing to the NMS and/or to a user interface device, to alert a network user.

As will be appreciated, the overall probing strategy used to model available bandwidth along a path may be made from the standpoint of the application SLAs. In particular, achieving high prediction accuracy may not be needed in all scenarios. For example, a high prediction accuracy (e.g., confidence score) may not be needed when the estimated bandwidth, albeit relatively inaccurate, is much larger than what is required by a given SLA. In another example, a high prediction accuracy may not be required for certain links that are only used intermittently as backup links. In such cases, other data from indirect sources, such as form an export/collection reporting mechanism, may be used to infer the available bandwidth. In other words, extra probing may be a waste of resources that may cause congestion upstream and may not even yield any useful results.

Figure 8:
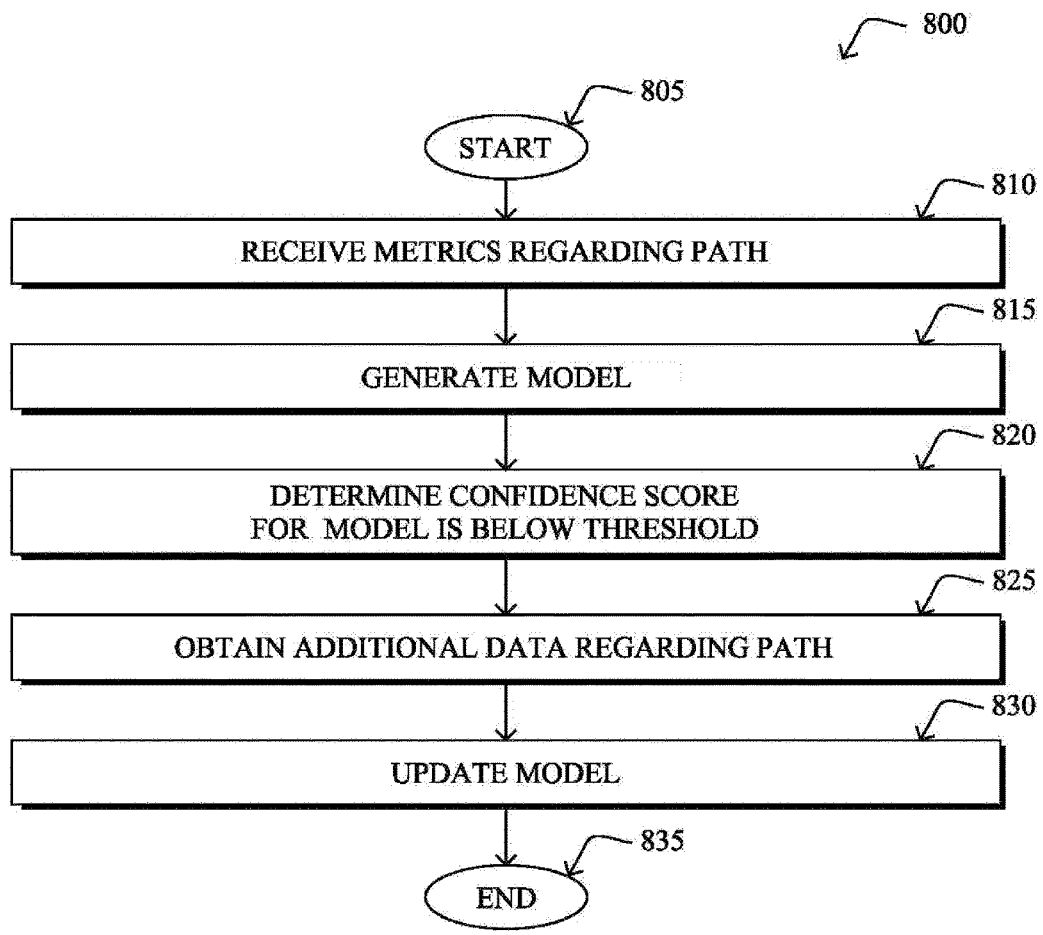
FIG. 8 illustrates an example simplified procedure for updating a predictive model.

FIG. 8 illustrates an example simplified procedure for updating a predictive model, in accordance with one or more embodiments described herein. The procedure 800 may start at step 805, and continues to step 810, where, as described in greater detail above, metrics regarding a network path are received. In some embodiments, the metrics may include an available bandwidth measurement obtained by actively probing the path. In other embodiments, the metrics may include data from indirect sources that may be used to infer an available bandwidth along a path. For example, an export/collection mechanism may be employed in the network to capture and report on certain link-related characteristics, such as packet drops, delays (e.g., queue state information), jitter, or other such characteristics that may be used to infer the available bandwidth along the path.

At step 815, a predictive model is generated using the metrics received in step 810, as described in greater detail above. Such a model may be operable, for example, to predict available bandwidth along a path. In various embodiments, the predictive model may use data fusion to merge measured path metrics and/or predicted path metrics from the various possible sources into a finalized prediction. For example, a Kalman filter, graphical model, or other such technique may be used to merge data from various sources into a bandwidth prediction. Such a prediction may also be associated with a particular type of traffic (e.g., voice, video, etc.), in some embodiments.

One data source may be bandwidth predictions made by a regression model that uses data from indirect sources, such as reported delays, jitter, dropped packets, etc. For example, an SVM, Bayesian network, regression techniques, etc., may be used to predict available bandwidth along the path based on other, non-bandwidth metrics. Another potential source of data that may be merged by the predictive model is a time series model that predicts future bandwidth availability based on prior measurements or predictions. For example, ARMA models, HMMs, Gaussian processes or the like, may provide bandwidth predictions. In further cases, actual bandwidth measurements (e.g., obtained via probing) may be a further source of data that may be merged by the predictive model.

At step 820, a confidence score for the predictive model is determined to be below a confidence threshold associated with the particular type of traffic, as highlighted above. In various embodiments, the confidence threshold may be associated with a particular SLA for the traffic. For example, a certain type of critical traffic may require a higher degree of confidence than another type of traffic that is more tolerant of delays.

At step 825, additional data regarding the path may be obtained based on the confidence score being below the confidence threshold, as detailed above. In some embodiments, direct measurements of the available bandwidth along the path may be obtained by initiating bandwidth probing along the path. In other embodiments, the additional data may be obtained from indirect sources, such as an export/collection mechanism whereby nodes actively report on the amount of observed delays, packet losses, etc. along the path. For example, even if the confidence score for the model is below the required threshold for a particular type of traffic, indirect sources may be used to provide the additional data regarding the path if the confidence score still indicates that the path is predicted to meet the SLA of the traffic.

At step 830, the predictive model 815 is updated using the additional data, as detailed above. For example, a time series used as a data source by the predictive model may be updated using bandwidth measurements obtained by actively probing the path. In another example, additional delay, jitter, etc. measurements may be used to update the model. Procedure 800 then ends at step 835.

Figure 9:
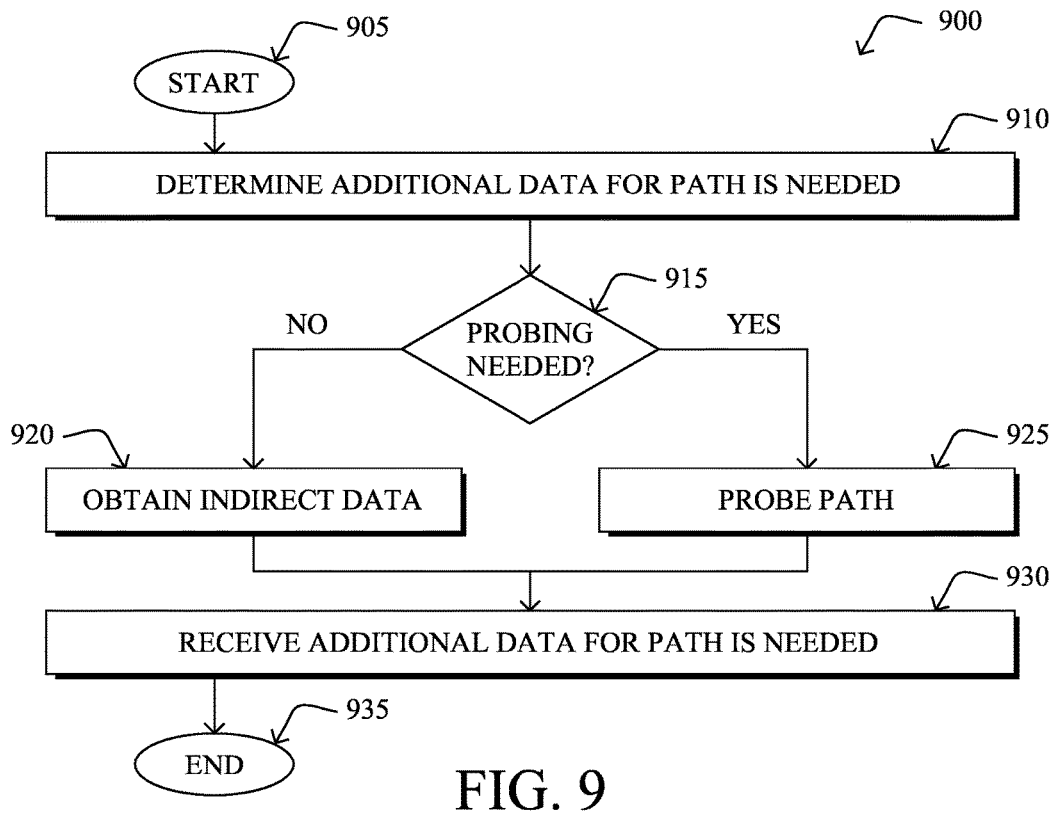
FIG. 9 illustrates an example simplified procedure for selectively probing a network path.

FIG. 9 illustrates an example simplified procedure for selectively probing a network path, in accordance with one or more embodiments described herein. The procedure 900 may start at step 905, and continues to step 910, where, as described in greater detail above, it may be determined that additional data regarding the path is needed. For example, it may be determined that additional data is needed regarding the path, if a predictive model used to predict the available bandwidth along the path has a confidence score below a given threshold.

At step 915, a determination is made as to whether or not the path should be probed, as detailed above. As will be appreciated, probing the path may give the most accurate and direct measurement of the available bandwidth along the path. However, such probing may also have a greater impact on the network than obtaining data from other indirect sources. Various factors that may be considered when determining whether probing is needed may include, but are not limited to, a network policy, the current state of the network, current bandwidth estimates, previous results from probing (e.g., errors, bandwidth estimates, etc.), or the like.

If probing is determined not to be needed in step 915, procedure 900 may proceed to step 920 where, as detailed above, data from indirect sources may be obtained. For example, link metrics such as delays, jitter, packet drops, etc., may be reported via an exporter/collector mechanism deployed throughout the network. However, if probing is determined to be needed in step 920, procedure 900 may proceed to step 925 and probing may be conducted along the path, to determine a direct measurement of the available bandwidth.

At step 930, the predictive model may be updated using either the data from the indirect sources obtained in step 920 or the direct bandwidth measurements obtained by probing the path in step 925. For example, a time series may be updated based on the bandwidth measurements taken during the probing process. Procedure 900 may then end at step 935.

Figure 10:
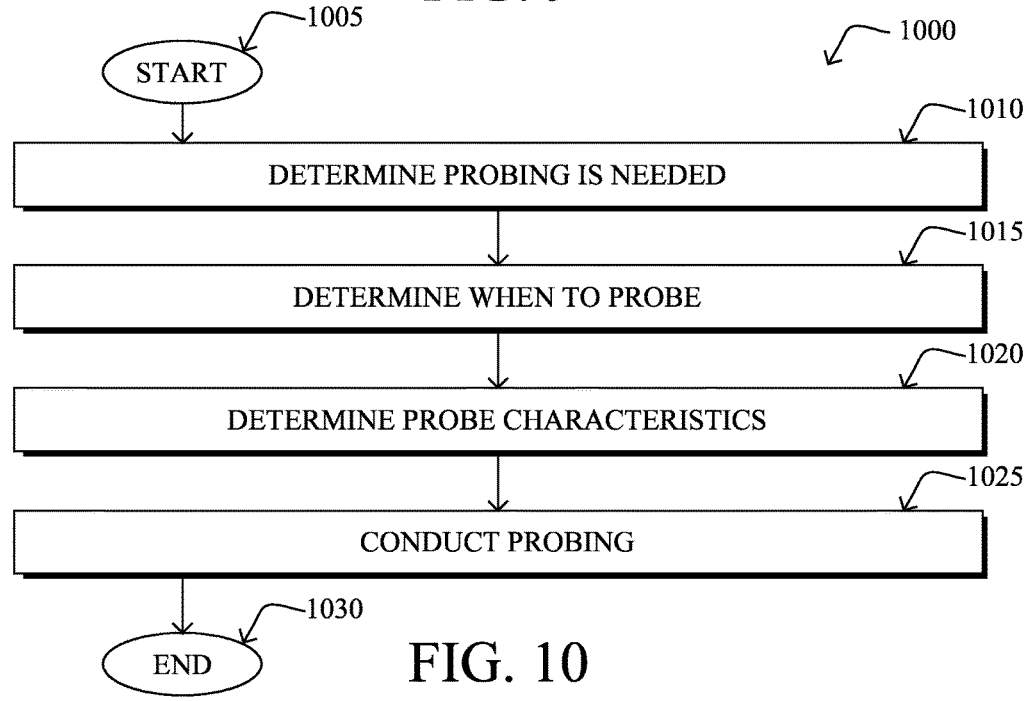
FIG. 10 illustrates an example simplified procedure for conducting probing of a network path.

FIG. 10 illustrates an example simplified procedure for conducting probing of a network path, in accordance with one or more embodiments described herein. The procedure 1000 may start at step 1005, and continues to step 1010, where, as described in greater detail above, it may be determined that probing of the path is needed. For example, probing may be initiated when the confidence score for a model used to predict the bandwidth along the path is below a threshold value. Such probing may result in a direct measurement of the available bandwidth along the path, which may be used to update the predictive model.

At step 1015, a time is determined at which probing is to be conducted, as described in greater detail above. In various embodiments, for example, the time to initiate probing may be based in part on the time of day, a current state of network congestion, a predicted available bandwidth along the path from the predictive model, a bandwidth prediction for the path, and/or an error associated with the bandwidth prediction. Further considerations may also take into account network policies. For example, a network policy may prevent probing the path at certain times.

At step 1020, characteristics of the probe may be determined, as described in greater detail above. For example, probe characteristics may include data regarding the path to be probed, the type of probing traffic to use, the frequency or number of probes, or other such information. In one embodiment, different combinations of such characteristics may be evaluated to select a set of characteristics that are expected to effect the greater change in the predictive model.

At step 1025, probing is then conducted by sending probing packets along the path, as detailed above. In some embodiments, the probing packets may be "colored" such that the type of probing traffic is indicated by the packets. During probing, the available bandwidth along the path may be determined based on the characteristics of the probing packets being sent and the monitored conditions of the path. Procedure 1000 then ends at step 1030.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, provide for a non-greedy approach to probing that ensures that resources in the network are not being wasted and the network paths themselves are not overloaded with probes. Such probing may be used, for example, to update a predictive model that is operable to predict available bandwidth along the path. In some aspects, all other available sources of information may be used to generate or update the predictive models, before probing is initiated. In further aspects, dynamic probing strategies are disclosed herein that may ensure that the most critical traffic is relying on probing for the most accurate predictions, while other sources of information may be used to make predictions for lower classes of traffic.

While there have been shown and described illustrative embodiments that provide for predictive network control to be used in multicarrier WANs, it is to be understood that various other adaptations and modifications may be made within the spirit and scope of the embodiments herein. For example, the predictive networking techniques described herein may be adapted for use in other forms of networks, such as the IoT. In addition, the embodiments have been shown and described herein with relation to specific protocols and naming conventions for purposes of illustration. However, the embodiments in their broader sense are not as limited, and may, in fact, be used with other types of suitable protocols and/or naming conventions. Further, while the techniques herein are described with respect to predicting the available bandwidth along a path, other metrics may also be predicted in a similar manner.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a network device, metrics regarding a path in a network;
   generating a predictive model using the received metrics, wherein the predictive model is operable to predict future available bandwidth along the path for a particular type of traffic;
   determining a confidence threshold associated with the particular type of traffic;
   determining whether a confidence score quantifying the degree of uncertainty associated with a given prediction over time for the predictive model is below the confidence threshold associated with the particular type of traffic;
   obtaining, by the device, additional data regarding the path based on a determination that the confidence score for the predictive model is below the confidence threshold associated with the particular type of traffic; and
   updating, by the device, the predictive model using the additional data regarding the path obtained based on the determination that the confidence score for the predictive model is below the confidence threshold.

2. The method as in claim 1, wherein the additional data regarding the path comprises one or more of: a delay metric, a jitter metric, or a packet loss metric along the path.

3. The method as in claim 2, wherein the additional data is obtained by a network reporting mechanism in which at least one node along the path exports the additional data and at least one node along the path collects the exported data.

4. The method as in claim 1, wherein the particular type of traffic is a first type of traffic, the method further comprising:
   generating a second predictive model that is operable to predict future available bandwidth along the path for a second type of traffic, wherein the second type of traffic is associated with a confidence threshold that differs from the confidence threshold associated with the first type of traffic.

5. The method as in claim 1, wherein obtaining additional data regarding the path comprises:
   determining whether the path should be probed, and
   sending, by the device, probe packets along the path based on a determination that the path should be probed.

6. The method as in claim 5, wherein sending probe packets along the path further comprises:
   identifying a time to send the probe packets along the path based in part on one or more of: a current time of day, a current state of network congestion, a predicted future available bandwidth along the path from the predictive model, a bandwidth prediction for the path, or an error associated with the bandwidth prediction.

7. The method as in claim 1, wherein obtaining additional data regarding the path comprises:
  determining whether the path should be probed, and
  obtaining, by the device, information from indirect sources based on a determination that the path should not be probed, wherein information from indirect sources includes delay information, jitter information, or packet loss information.

8. The method as in claim 1, wherein the predictive model includes one or more of: a regression model that is operable to predict available bandwidth along the path based on non-bandwidth path metrics, or a time series model that is operable to predict available bandwidth along the path based on prior bandwidth measurements along the path.

9. The method as in claim 8, wherein the predictive model is further operable to merge predictions from the regression model and the time series model.

10. An apparatus, comprising:
  one or more network interfaces to communicate with a network;
  a processor coupled to the network interfaces and adapted to execute one or more processes; and
  a memory configured to store a process executable by the processor, the process when executed operable to:
    receive metrics regarding a path in the network;
    generate a predictive model using the received metrics, wherein the predictive model is operable to predict future available bandwidth along the path for a particular type of traffic;
    determine a confidence threshold associated with the particular type of traffic;
    determine whether a confidence score quantifying the degree of uncertainty associated with a given prediction over time for the predictive model is below the confidence threshold associated with the particular type of traffic;
    obtain additional data regarding the path based on a determination that the confidence score for the predictive model is below the confidence threshold associated with the particular type of traffic; and
    update the predictive model using the additional data regarding the path obtained based on the determination that the confidence score for the predictive model is below the confidence threshold.

11. The apparatus as in claim 10, wherein the additional data regarding the path comprises one or more of: a delay metric, a jitter metric, or a packet loss metric along the path.

12. The apparatus as in claim 11, wherein the additional data is obtained by a network reporting mechanism in which at least one node along the path exports the additional data and at least one node along the path collects the exported data.

13. The apparatus as in claim 10, wherein the particular type of traffic is a first type of traffic, and wherein the process when executed is further operable to:
  generate a second predictive model that is operable to predict future available bandwidth along the path for a second type of traffic, wherein the second type of traffic is associated with a confidence threshold that differs from the confidence threshold associated with the first type of traffic.

14. The apparatus as in claim 10, wherein obtaining additional data regarding the path comprises:
  determining whether the path should be probed, and
  sending, by the device, probe packets along the path based on a determination that the path should be probed.

15. The method as in claim 14, wherein the probe packets are sent along the path by:
  identifying a time to send the probe packets along the path based in part on one or more of: a current time of day, a current state of network congestion, a predicted future available bandwidth along the path from the predictive model, a bandwidth prediction for the path, or an error associated with the bandwidth prediction.

16. The apparatus as in claim 10, wherein obtaining additional data regarding the path comprises:
  determining whether the path should be probed, and
  obtaining, by the device, information from indirect sources based on a determination that the path should not be probed, wherein information from indirect sources includes delay information, jitter information, or packet loss information.

17. The apparatus as in claim 10, wherein the predictive model includes one or more of:
  a regression model that is operable to predict available bandwidth along the path based on non-bandwidth path metrics, or a time series model that is operable to predict available bandwidth along the path based on prior bandwidth measurements along the path.

18. The apparatus as in claim 17, wherein the predictive model is further operable to merge predictions from the regression model and the time series model.

19. A tangible, non-transitory, computer-readable media having software encoded thereon, the software when executed by a processor operable to:
  receive metrics regarding a path in the network;
  generate a predictive model using the received metrics, wherein the predictive model is operable to predict future available bandwidth along the path for a particular type of traffic;
  determine a confidence threshold associated with the particular type of traffic;
  determine whether a confidence score quantifying the degree of uncertainty associated with a given prediction over time for the predictive model is below the confidence threshold associated with the particular type of traffic;
  obtain additional data regarding the path based on a determination that the confidence score for the predictive model is below the confidence threshold associated with the particular type of traffic; and
  update the predictive model using the additional data regarding the path obtained based on the determination that the confidence score for the predictive model is below the confidence threshold.

20. The computer-readable media as in claim 19, wherein the predictive model includes one or more of: a regression model that is operable to predict available bandwidth along the path based on non-bandwidth path metrics, or a time series model that is operable to predict available bandwidth along the path based on prior bandwidth measurements along the path.

* * * * *